United States Patent Office

3,506,621
Patented Apr. 14, 1970

3,506,621
PROCESS FOR THE PREPARATION OF ALKYD RESINS
Saburo Fukushima, Sakai-shi, Keiichi Takiyama, Suita-shi, and Masao Nikki, Ibaragi-shi, Japan, assignors to Nippon Shokubai Kagaku Kogyo Co., Ltd., Osaka, Japan, a corporation of Japan
No Drawing. Filed Mar. 5, 1968, Ser. No. 710,659
Claims priority, application Japan, Mar. 6, 1967, 42/13,773; Aug. 8, 1967, 42/50,495
Int. Cl. C08g 17/10, 37/34
U.S. Cl. 260—75    6 Claims

ABSTRACT OF THE DISCLOSURE

Process for the preparation of alkyd resins with excellent coating characteristics which comprises reacting monoolefins containing 6 to 20 carbon atoms with at least one polycarboxylic anhydride and hydrogen peroxide at a molar ratio of 1:1–3:1–10 at temperatures ranging from 20° C. to 120° C., and subjecting the resultant reaction mixture to an esterification reaction with polyhydric alcohols at temperatures ranging from 150° C. to 270° C., until the acid value of the product is reduced to below 60.

---

This invention relates to the preparation of alkyd resins with excellent coating characteristics. More particularly, the invention relates to novel, improved processes for the preparation of alkyd resins with excellent chemical resistance, waterproof property, heat resistance, physical properties, adhesive property, etc. with high yield and in some cases within shorter period.

Preparation of resins for coatings use, which are generally known as "oil-modified alkyd resins," by reacting natural fat and oil such as non-drying, semi-drying and drying oils, or fatty acids of those natural fat and oil, with polycarboxylic acids or anhydrides thereof and polyhydric alcohols, is known. Such oil-modified alkyd resins are very useful and have received rather wide acceptance. Their resistance to chemicals, water and heat, hardness and adhesions, however, are not quite satisfactory. As one of the attempts to improve those shortcomings, for instance, it has been proposed to lower the ester group concentration in the alkyd resin by reacting 1,2-epoxyalkylene and/or 1,2-alkylene glycol together with polycarboxylic acid or anhydride thereof, and polyhydric alcohol. However, that method is cumbersome in that 1,2-epoxyalkylene must be formed in advance by epoxidation of monoolefin with a period, and 1,2-alkylene glycol, by hydrolysis of 1,2-epoxyalkylene.

Accordingly, the object of the invention is to provide alkyd resins of improved properties with less expense, by simple process of preparation. Other objects of the invention will become apparent from reading the following descriptions.

The alkyd resins in accordance with the above objects of the invention can be prepared in accordance with any of the following three types of embodiments.

(I) Process which comprises reacting monoolefins containing 6 to 20 carbon atoms with polycarboxylic anhydrides and hydrogen peroxide, and heating the resultant reaction mixture with polyhydric alcohols;

(II) Process which comprises reacting monoolefins containing 6 to 20 carbon atoms with polycarboxylic anhydrides and hydrogen peroxide, and heating the resultant reaction mixture with (1) at least one compound selected from the group consisting of polycarboxylic acids, polycarboxylic anhydrides and monocarboxylic acids, and (2) polyhydric alcohols;

(III) Process which comprises performing the reaction of monoolefins containing 6 to 20 carbon atoms with polycarboxylic anhydrides and hydrogen peroxide, which is mentioned in the above embodiments (I) and (II), in the presence of at least one partially esterified product having at least one unreacted hydroxyl group in each molecule, the product being obtained by reacting at least one compound selected from the group consisting of polycarboxylic acids, anhydrides thereof and monocarboxylic acids, with polyhydric alcohols. The said reaction of monoolefins with polycarboxylic anhydrides and hydrogen peroxide, as mentioned in the above embodiments (I) and (II), is performed by dropping hydrogen peroxide in the form of aqueous solution or solution in an inert organic solvent such as ether, hydrocarbon and halogenated hydrocarbon, into a mixture of polycarboxylic anhydrides and monoolefins, at a temperature of 20° C. to 120° C., preferably 40° C. to 70° C., the said mixture comprising 1 to 3 moles, preferably 1.2 to 2.0 moles, of the anhydride component per mole of the monoolefin, and furthermore the mixture being optionally dissolved in a suitable inert solvent. The preferred hydrogen peroxide concentration in the solution may range from 3% to 90% by weight of the peroxide, inter alia, 5% to 60% by weight. There are employed 1 to 10 moles, preferably 1.2 to 2.0 moles for each mole of the monoolefin. The dropping of the hydrogen peroxide solution is continued maintaining the temperature of the reaction mixture within the above-specified range by heating and cooling. After the addition of hydrogen peroxide solution, the reaction mixture is maintained at the above-specified temperature range for additional 2 to 8 hours, and whereupon the reaction is completed.

According to the practices of above embodiment (I), thus obtained reaction mixture is optionally heated gradually to 100° C. to 150° C., preferably in an inert atmosphere. Thus the unreacted hydrogen peroxide, the water and/or at least a portion of the organic solvent which are present in the reaction mixture are removed. Then the mixture is subjected to the esterification reaction with polyhydric alcohols. The reaction is performed in the manner of accepted practices such as the solvent process or the fusion process, by heating the reaction mixture with polyhydric alcohols to a temperature of from 150° C. to 270° C., preferably 190° C. to 250° C., preferably in an inert atmosphere, until an acid value (mg. of KOH/g. resin) of the product is lowered to the desired level, for example, below 60, preferably 2 to 30.

In the embodiment (II), at least one compound selected from polycarboxylic anhydrides, polycarboxylic acids and monocarboxylic acids is caused to be present in the esterification reaction system which is described with reference to the embodiment (I). Thus the accordingly modified product can be obtained.

According to the above embodiments (I) and (II), in certain cases the reaction may not progress smoothly because the reaction of monoolefins with polycarboxylic anhydrides and hydrogen peroxide is performed in a heterogeneous system, and also because the reaction mixture becomes pasty causing its agitation to be more difficult. Such obstruction can be removed by adopting the embodiment (III) with the scope of the present invention.

According to the embodiment (III), the reaction of monoolefins with polycarboxylic anhydrides and hydrogen peroxide is performed, as aforementioned, in the presence of a partially esterified product having at least one unreacted hydroxyl group in a molecule, the product being obtained by reaction of polyhydric alcohols with at least one compound selected from the group consisting of polycarboxylic acids, anhydrides thereof and monocarboxylic acids. The presence of the partially esterified product, preferably in an amount of 1% to 40% by weight for the total weight of the polycarboxylic anhydrides and monoolefins, causes the entire system to take a homogeneous emulsion state of low viscosity. Consequently, the reaction progresses smoothly. Since the partially esterified product is ultimately converted to a part of the alkyd resin which is the object product, its removal from the system after the reaction is not required. Particularly, when the partially esterified product employed is formed from the same polycarboxylic acids or anhydrides thereof, or monocarboxylic acids with polyhydric alcohols, to the main consituents of the obejct alkyd resin, its presence in no way objectionably affects the properties of the product alkyd resin.

Normally, addition of an emulsifier would be considered for the purpose of converting a heterogeneous reaction system to a homogeneous emulsion. In this case, however, if the emulsifier is not removed before or after the reaction mixture is subjected to the esterification reaction with polyhydric alcohols, the resultant alkyd resin exhibits poor resistance to water and chemical due to the emulsifier contained therein, and furthermore the resin yellows and deteriorates with the passage of time. Therefore, removal of the emulsifier employed which requires extremely complex operations is essential.

The preparation of partially esterified product is performed in accordance with the accepted practice. The ratio of the reactants is so determined that at least one of hydroxyl groups of carboxyl group in a molecule of each reactant may be able to participate in the reaction. The esterification reaction must be controlled so as to leave at least one unreacted hydroxyl group in one molecule of the product. Whereas, the presence of unreacted carboxyl group in the product's molecule is not absolutely required.

The reactions of monoolefins with polycarboxylic anhydrides and hydrogen peroxide in accordance with the embodiment (III) may be performed under the same conditions and in the same manner to the reaction in the embodiments (I) and (II), except that the partially esterified product as described in the above is present in the system. The partially esterified product may be mixed with the polycarboxylic anhydrides and monoolefins in advance of the reaction, or may be dispersed in a solvent with hydrogen peroxide to be dropped into the reaction system. Adding of the partially esterified product separately from, but simultaneously with, the addition of hydrogen peroxide solution is of course permissible.

In the embodiment (III) also the product of the above-described reaction is subjected to the esterification reaction. The conditions and procedures of the esterification reaction may be identical with those described as to the embodiments (I) and (II).

According to the invention, the starting materials as described hereinbelow may be suitably selected and used, for any of the embodiments (I) through (III).

Specific type of monoolefins is not critical, but any of those having 6 to 20 carbon atoms may be used. Preferred monoolefins include those obtained by thermal cracking of paraffin wax or paraffin-type petroleum products, and long chain monoolefins which are obtained by polymerization of lower monoolefins such as ethylene and propylene in the presence of a polymerization catalyst such as Ziegler catalyst.

As polycarboxylic anhydrides, anhydrides of succinic, glutaric, maleic, phthalic, tetrahydrophthalic, hexahydrophthalic, trimellitic, and pyromellitic acids; and Diels-Alder addition products of maleic anhydride with terpenes or dienes such as cyclopentadiene and hexachlorocyclopentadiene, can be suitably used.

Preferred polyhydric alcohols include, for example, ethyleneglycol, propyleneglycol, diethyleneglycol, dipropyleneglycol, butanediol, pentanediol, neopentylglycol, triethyleneglycol, hexanediol, glycerol, butanetriol, trimethylolethane, trimethylolpropane, pentaerythritol, dipentaerythritol, diglycerol, triglycerol, sorbitol, etc.

As hydrogen peroxide, use of 3% to 90%, preferably 30% to 60%, aqueous or organic solvent solution is practical.

As the useful polycarboxylic acid, the following may be named: malonic, succinic, glutaric, adipic, azelaic, sebacic, maleic, fumaric, phthalic, tetrahydrophthalic, hexahydrophthalic, isophthalic, terephthalic, and diglycollic acids; dimers of fatty acid of semi-drying and drying oils such as soybean oil, linseed oil, etc.; citric, trimellitic, and pyromellitic acids.

As the monocarboxylic acid, fatty acids of animal and vegetable, non-drying, semi-drying and drying oils, benzoic acid, p-tertiary butylbenzoic acid, and abietic acid, etc. are well suited for the use.

The alkyd resins prepared in accordance with the invention, regardless which of the embodiments (I), (II) and (III) is employed, are all compatible with melamine resin, urea resin, guanamine resin, thermosetting acrylic resin, cellulose derivatives, etc. and provide coating compositions. Furthermore, the coatings formed of those compositions exhibit excellent resistance to various chemicals and excellent physical properties. The adhesion of the coatings to substrates is also good.

The following specific examples illustrate the invention. Parts are by weight unless otherwise specified.

Among the examples, Examples 1 to 9 show the preparation of bridging resins or partially esterified products employed in Examples 10 to 21.

EXAMPLE 1

A reactor equipped with a thermometer, stirrer, and a reflux condenser equipped with water-separator was charged with 126 parts (1 mole) of melamine, 400 parts (4.9 moles) of 37% formaline, 400 parts (5.4 moles) of butanol and 50 parts of toluene. The pH of the system was adjusted to 6.2 with sodium carbonate. Melamine was dissolved upon heating of the system to 90° C., and the temperature was maintained at that level for additional 30 minutes, during which methylolation reaction was advanced. Then a minor amount of butyl phosphate was added to the system. The system was further maintained at 90° C. for one hour, and whereby etherification with butanol was performed.

The reaction product was distilled under a reduced pressure to be removed of butanol and water. Thus obtained butylated melamine resin was dissolved in xylol to a concentration of 60%.

EXAMPLE 2

The same reactor employed in Example 1 was charged with 374 parts (2 moles) of benzoguanamine, 487 parts (6 moles) of 37% formaline, 740 parts (10 moles) of butanol and 40 parts toluene. The pH of the system was adjusted to 6.2 with sodium carbonate, and then the system was heated to 100° C. Thereupon the benzoguanamine was dissolved. The temperature was maintained for 45 minutes to assist the methylolation reaction, and thereafter a minor amount of butyl phosphate was added to the system. Etherification with butanol was performed for the following 90 minutes, during which the temperature of the system was maintained at 100° C.

The reaction mixture was distillated under a reduced pressure to be removed of butanol and water. Thus obtained butylated benzoguanamine resin was dissolved in xylol to a concentration of 60%.

EXAMPLE 3

A reactor equipped with a stirrer, thermometer, and a reflux condenser was charged with 184 parts (2 moles) of glycerol and 296 parts (2 moles) of phthalic anhydride. The system was heated to 100° C. under agitation, and the same temperature level was maintained for 3 to 5 hours. The acid value of the resultant reaction mixture coincided with the theoretical value of half-ester. Therefore, the partially esterified product was glyceryl monophthalate.

EXAMPLE 4

Example 3 was repeated except that 296 parts (2 moles) of phthalic anhydride was replaced by 304 parts (2 moles) of tetrahydrophthalic anhydride. Thus obtained product was glyceryl monotetrahydrophthalate.

EXAMPLE 5

The same reactor as employed in Example 3 was charged with 62 parts (1 mole) of ethyleneglycol and 98 parts (1 mole) of maleic anhydride, and the system was heated to 55° C. under agitation. After maintaining the system at that temperature for 4 hours, the acid value of the reaction mixture became the theoretical value of half-ester (350). Therefore, thus obtained partially esterified product was ethyleneglycol monomaleate.

EXAMPLE 6

The same reactor as employed in Example 1 was charged with 92 parts (1 mole) of glycerol, 146 parts (1 mole) of adipic acid, and 25 parts of toluene. The system was heated to 165° C. for 5 hours under agitation in nitrogen current. The acid value of the reaction mixture (glyceryl adipate) became 235. (The theoretical acid value of half-ester is 255.)

EXAMPLE 7

The same reactor as employed in Example 1 was charged with 92 parts (1 mole) of glycerol, 178 parts (1 mole) of p-tertiary butylbenzoic acid and 25 parts of toluene. The system was heated to 175° C. for 6 hours under agitation in nitrogen current. The acid value of the resultant reaction mixture (glyceryl mono p-tertiary butylbenzoate) was about zero.

EXAMPLE 8

Example 7 was repeated, except that 178 parts (1 mole) of p-tertiary butylbenzoic acid was replaced by 122 parts (1 mole) of benzoic acid. As the partially esterified product, glyceryl monobenzoate whose acid value was about zero was obtained.

EXAMPLE 9

The same reactor as employed in Example 3 was charged with 120 parts (1 mole) of trimethylolethane and 148 parts (1 mole) of phthalic anhydride. The system was heated to 135° C. for 5 hours under agitation in nitrogen current. Then the acid value of the reaction mixture reached the theoretical value of the half-ester (209). Therefore, the partially esterified product obtained was trimethylolethane monophthalate.

EXAMPLE 10

A reactor equipped with a thermometer, stirrer, reflux condenser fitted with water-separator and an inert gas inlet was charged with a mixture composed of 41 parts of α-olefin containing 6 to 7 carbon atoms, 93.6 parts of phthalic anhydride and 50 parts of xylene. The mixture was heated to 60° C. under agitation, and to which 95.5 parts of 30% aqueous hydrogen peroxide solution was dropped over the period of 45 minutes. In the meantime, the system was maintained at 60° C. Thereafter the temperature of the system was gradually raised to 90° C. over one hour, and at 90° C. the reaction was continued for additional 6 hours. Then 14.6 parts of adipic acid and 37.2 parts of glycerol were added to the system. The system was further heated in nitrogen current, and its temperature was gradually raised to 205° C. while water, unreacted hydrogen peroxide and 30 parts of xylene were distilled off the system. The reaction was further continued at that temperature until the acid value of the reaction product was reduced to 4–6.

The 60% xylene solution of the product resin had a viscosity (Gardner-Holdt) of Z–$Z_1$. This solution was blended with the butylated melamine resin of Example 1 at a weight ratio of 7 to 3 in terms of solids. Seventy (70) parts of the resultant composition was mixed with 40 parts of titanium white. Thus white enamel was obtained. The enamel was applied onto a steel plate (0.3 mm. thick), and heated at 120° C. for 30 minutes. Thus hardened, applied film had the properties as given in Table 1 below.

TABLE 1

[Dry film thickness; 25–30μ]

| Test items: | Film performance |
|---|---|
| Immersion in boiling water for 2 hours | No change. |
| Immersion in 5% NaOH solution for 72 hours (room temp.) | Do. |
| Immersion in 5% $H_2SO_4$ solution for 72 hours (room temperature) | Do. |
| Gloss, 60° (photo-volt) | 91. |
| Du Pont impact test (500 g.) | 40. cm. |
| Mandrel (bending) test (180°, 2 mm. φ) | No change. |
| Pencil hardness | F. |

EXAMPLE 11

Similarly to Example 10, a mixture composed of 70.0 parts of α-olefin containing 11 to 14 carbon atoms, 93.6 parts of phthalic anhydride and 17.8 parts of p-tertiary butylbenzoic acid was heated to 60° C. under agitation and into the mixture 44.0 parts of 60% aqueous hydrogen peroxide solution was dropped over 60 minutes. During the addition, the system was maintained at 60° C. Thereafter the temperature of the system was gradually raised to 85° C. over one hour, and at 85° C. the reaction was continued for 6 hours. Then 48.3 parts of trimethylolpropane and 18 parts of xylene were added to the system, followed by gradual heating of the system in nitrogen current up to 195° C., while removing the water and unreacted hydrogen peroxide. The reaction was continued at that temperature until the acid value of the reaction product was reduced to 5–7.

The 60% xylene solution of the product resin had a viscosity (Gardner-Holdt) of Y–Z. This resin solution was similarly employed as a component of white enamel in the manner described in Example 10. The various properties of the hardened film of the enamel applied onto a steel plate (0.3 mm. thick) were as follows:

TABLE 2

[Dry film thickness; 25–30μ]

| Test items: | Film performance |
|---|---|
| Immersion in boiling water for 2 hours | No change. |
| Immersion in 5% NaOH solution for 72 hours (room temperature) | Do. |
| Immersion in 5% $H_2SO_4$ solution for 72 hours (room temperature) | Do. |
| Gloss, 60° (photo-volt) | 93. |
| Du Pont impact test (500 g.) | 40 cm. |
| Mandrel (bending) test (180°, 2 mm. φ) | No change. |
| Pencil hardness | H. |

EXAMPLE 12

White enamel was prepared by adding 35 parts of titanium white to 80 parts of a composition composed of the alkyd resin solution obtained in Example 10 and the butylated benzoguanamine resin of Example 2, the blend ratio being 7:3 by weight in terms of solids. The enamel was applied onto a steel plate (0.3 mm. thick), and heated at 150° C. for 20 minutes. The properties of thus hardened film were as given in Table 3.

TABLE 3

[Dry film thickness; 25–30μ]

| Test items: | Film performance |
|---|---|
| Gloss, 60° (photo-volt) | 97. |
| State of applied film | Excellent, no yellowing. |
| Du Pont impact test (500 g.) | 40 cm. |
| Mandrel test (180°, 2 mm. φ) | No change. |
| Pencil hardness | H–2H. |
| Immersion in boiling water for 2 hours | No change. |
| Immersion is water (30° C.) for 7 days | Do. |
| Immersion in 5% NaOH solution for 120 hours (room temperature) | Do. |
| Immersion in 5% $H_2SO_4$ solution for 120 hours (room temperature) | Do. |

EXAMPLE 13

The same reactor as employed in Example 10 was charged with 107 parts (0.437 mole) of α-olefin containing 15 to 20 carbon atoms and 113 parts (0.763 mole) of phathalic anhydride. The system was heated at 60° C. under agitation. Then 46.3 parts (0.682 mole) of 50% aqueous hydrogen peroxide was dropped into the system over one hour, while the temperature of the system was maintained at 60° C. (Therefore, the molar ratio of the α-olefin, phthalic anhydride and hydrogen peroxide was 1:1.75:1.56.) Thereafter the system was still maintained at 60° C., and after 5 hours the residual amount of hydrogen peroxide became constant. The conversion of the α-olefin at that time was 88%. After the reaction mixture was admixed with 20 parts of xylol, the mixture was heated to 150° C., in the meantime distilling off water and unreacted hydrogen peroxide. Then 34 parts (0.37 mole) of glycerol was added to the mixture, and the system was heated to 200° C. in nitrogen current. The reaction was continued at that temperature until the acid value of the product reached 6–8.

The 60% xylol solution of the product resin had a viscosity (Gardner-Holdt) of $Z_2$–$Z_3$. This resin solution was blended with the butylated melamine resin produced in Example 1 at a weight ratio of 7:3 on solid basis. From 70 parts of this composition and 40 parts of titanium white, white enamel was prepared, whch was applied onto a steel plate (0.3 mm. thick) and heated at 120° C. for 30 minutes. The properties of thus hardened enamel film were as shown in Table 4, at the end of the specification.

EXAMPLE 14

The same reactor as employed in Example 10 was charged with 54.1 parts (0.451 mole) of monoolefin which was obtained by dehydrogenation of paraffin containing 6 to 11 carbon atoms, 93.6 parts (0.632 mole) of phthalic anhydride and 14.6 parts (0.1 mole) of adipic acid. The system was heated to 60° C. under agitation, and into which 95.5 parts (0.843 mole) of 30% aqueous hydrogen peroxide solution was dropped over 45 minutes. (Therefore, the molar ratio of the monoolefin, phthalic anhydride and hydrgen peroxide was 1:1.4:1.87.) During the hydrogen peroxide addition, the system was maintained at 60° C. Thereafter the system was heated to 65° C. an maintained at that temperature for 6 hours, when the residual amount of hydrogen peroxide became constant. The conversion of the monoolefin at that time was 85%. Then the reaction mixture was added with 37.2 parts (0.404 mole) of glycerol, and gradually heated to 205° C. in nitrogen current. In the meantime, the water and unreacted hydrogen peroxide was removed by distillation. The reaction was continued at 205° C. until the acid value of the product became 14–15.

The 60% xylol solution of the product resin had a viscosity (Gardner-Holdt) of Z–$Z_1$. This resin solution was used as a component of white enamel in the similar manner to Example 13. The various properties of the hardened film of the enamel were as given in Table 4.

EXAMPLE 15

The same reactor as employed in Example 10 was charged with 91 parts (0.5 mole) of α-olefin containing 12 to 14 carbon atoms and 88.8 parts (0.6 mole) of phthalic anhydride. The system was heated to 40° C. with stirring, and at that temperature a liquid mixture composed of 68 parts (0.6 mole) of 30% aqueous hydrogen peroxide and 48 parts (0.2 mole) of glyceryl monophthalate obtained in Example 3 was dropped into the system over 30 minutes. (Therefore, the molar ratio of the α-olefin, phthalic anhydride and hydrogen peroxide was 1:1.2:1.2, and the quantity of the partially esterified product was 26.7% for the sum of the α-olefin and phthalic anhydride.

After completion of the addition, the system was maintained at 40° C. for 2.5 hours, when the residual amount of hydrogen peroxide became constant. The conversion of the α-olefin at that time was 98.5%. Thereafter water and unreacted hydrogen peroxide were removed from the system as the system was gradually heated to 140° C. in nitrogen current. To the reaction mixture, then 9.2 parts (0.1 mole) of glycerol, 3.1 parts (0.05 mole) of ethyleneglycol and 20 parts of xylol were added, and the mixture was heated to 230° C. in nitrogen current. The reaction was continued at that temperature until the acid value of the product was reduced to 6–7.

The 60% xylol solution of the product resin had a viscosity (Gardner-Holdt) of Y–Z. This resin solution was used as a component of white enamel in the similar manner to Example 13. The properties of the hardened film of the enamel applied onto a steel plate (0.3 mm. thick) were as given in Table 4.

EXAMPLE 16

The same reactor as employed in Example 10 was charged with 98 parts (0.4 mole) of α-olefin containing 15 to 20 carbon atoms and 118.4 parts (0.8 mole) of phthalic anhydride. While the system was heated to 45° C., a liquid mixture consisting of 32.6 parts (0.48 mole) of 50% aqueous hydrogen peroxide solution, 12 parts (0.05 mole) of glyceryl monophthalate obtained in Example 3 and 12.6 parts (0.05 mole) of glyceryl monobenzoate of Example 8 was dropped into the system over 45 minutes. (Therefore, the molar ratio of the α-olefin, phthalic anhydride and hydrogen peroxide was 1:2.0:1.2, and the sum of the two partially esterfied products was 11.35% to the sum of the α-olefin and phthalic anhydride.) After the dropping, the system was maintained at 45° C. for additional 3.5 hours, when the residual amount of hydrogen peroxide became constant. The conversion of the α-olefin at that time was 97.7%. Then 18 parts of xylol was added to the reaction mixture, and water and unreacted hydrogen peroxide were removed therefrom as the mixture was gradually heated to 150° C. in nitrogen current. Furthermore, 30.3 parts (0.33 mole) of glycerol, 6.1 parts (0.08 mole) of propyleneglycol, and 8.9 parts (0.05 mole) of p-tertiary butylbenzoic acid were added to the system, followed by heating to 220° C. in nitrogen current. The reaction was continued at that temperature until the acid value of the product became 5–7.

The 60% xylol solution of the product resin had a viscosity (Gardner-Holdt) of $Z_1$. The properties of the applied film of white enamel prepared from this resin solution and hardened similarly to Example 13 were as given in Table 4.

EXAMPLE 17

The same reactor as employed in Example 10 was charged with 72 parts (0.6 mole) of α-olefin containing 6 to 11 carbon atoms and 103.7 parts (0.7 mole) of phthalic anhydride. While the system was maintained at 40° C., a liquid mixture consisting of 81.6 parts (1.2 moles of 50% aqueous hydrogen peroxide solution, 24 parts (0.1 mole) of glyceryl monphthalate obtained in Example 3, and 22 parts (0.1 mole) of glyceryl monoadipate of Example 6 was dropped into the system over 30 minutes. (Therefore, the molar ratio of the α-olefin, phthalic anhydride and hydrogen peroxide was 1:1.17:2.0. The sum quantity of the two partially esterified products was 38.2% to the sum of the αolefin and phthalic anhydride.) After the addition, the system was maintained at 40° C. for 3 hours, when the residual amount of hydrogen peroxide became constant. The conversion of the α-olefin at that time was 99.3%. Thereafter the water and unreacted hydrogen peroxide were removed from the system as it was gradually heated to 140° C. in nitrogen current. Then 29.5 parts (0.22 mole) of trimethylolpropane, 14.6 parts (0.1 mole) of adipic acid and 15 parts of xylol were added to the system, followed by heating to 200° C. in nitrogen current. The reaction was continued at that temperature until the acid value of the product was reduced to 8–9.

The 60% xylol solution of the product resin had a viscosity (Gardner-Holdt) of $Z_3$. The properties of the applied film of white enamel, which was prepared from this resin solution and hardened similarly to Example 13, were as given in Table 4.

EXAMPLE 18

The same reactor as employed in Example 10 was charged with 91 parts (0.5 mole) of the monoolefin obtained by dehydrogenation of paraffin containing 12 to 14 carbon carbon atoms, and 111 parts (0.75 mole) of phthalic anhydride. While the system was maintained at 60° C., a liquid mixture consisting of 228 parts (0.67 mole) of 10% aqueous hydrogen peroxide solution and 9.8 parts (0.05 mole) of the glyceryl mono p-tertiary butylbenzoate obtained in Example 7 was dropped into the system over 30 minutes. (Therefore, the molar ratio of the monoolefin, phthalic anhydride and hydrogen peroxide was 1:1.5:1.34. The quantity of the partially esterified product was 4.85% to the sum of the monoolefin and phthalic anhydride.) After the addition, the system was still maintained at 60° C. for 4 additional hours, when the residual amount of hydrogen peroxide became constant. The conversion of the monoolefin at that time was 93%. The water and unreacted hydrogen peroxide were then removed from the system as it was gradually heated to 150° C. Thereafter 37.7 parts (0.41 mole) of glycerol, 30.3 parts (0.15 mole) of sebacic acid, 6.1 parts (0.05 mole) of benzoic acid and 17 parts of xylol were added to the system, followed by heating to 230° C. in nitrogen current. The reaction was continued at that temperature until the acid value of the product was reduced to 13–14.

The 60% xylol solution of the product resin had a viscosity (Gardner-Holdt) of $Z-Z_1$. The properties of the applied film of white enamel, which was prepared from this resin solution and hardened similarly to Example 13, were as given in Table 4.

EXAMPLE 19

The same reactor as employed in Example 10 was charged with 94.6 parts (0.52 mole) of α-olefin containing 12 to 14 carbon atoms and 118.5 parts (0.8 mole) of phthalic anhydride. The system was heated to 40° C., and while that temperature was maintained, a liquid mixture consisting of 59.2 parts (0.697 mole) of 40% aqueous hydrogen peroxide solution, 26.8 parts (0.15 mole) of trimethylolethane monophthalate obtained in Example 9, and 37.8 parts (0.15 mole) of glyceryl monobenzoate of Example 8 was dropped into the system over 30 minutes. (Therefore, the molar ratio of the α-olefin, phthalic anhydride and hydrogen peroxide was 1:1.54:1.34. The sum quantity of the two partially esterified products was 30.3% to the sum of the α-olefin and phthalic anhydride.) After the addition, the system was further maintained at 40° C. for 2.5 hours, when the residual amount of hydrogen peroxide became constant. The conversion of the α-olefin at that time was 98.3%. Then the water and unreacted hydrogen peroxide were removed from the system as it was gradually heated to 150° C. To the remaining system (36 parts (0.3 mole) of trimethylolethane, 15.2 parts (0.1 mole) of tetrahydrophthalic anhydride and 25 parts of xylol were added, followed by heating to 190° C. in nitrogen current. The reaction was continued at that temperature until the acid value of the product was reduced to 6–7.

The 60% xylol solution of the product resin had a viscosity (Gardner-Holdt) of $Z_3$. The properties of the applied film of white enamel, which was prepared from this resin solution and hardened in the similar manner to Example 13, were as given in Table 4.

EXAMPLE 20

The same reactor as employed in Example 10 was charged with 84 parts (0.7 mole) of the monoolefin obtained by dehydrogenation of paraffin containing 6 to 11 carbon atoms, 59.2 parts (0.4 mole) of phthalic anhydride and 68.4 parts (0.45 mole) of tetrahydrophthalic anhydride. The system was heated to 40° C., and while that temperature was maintained, a liquid mixture consisting of 95.2 parts (1.4 moles) of 50% aqueous hydrogen peroxide solution, 12.2 parts (0.05 mole) of glyceryl monotetrahydrophthalate obtained in Example 4, and 22.2 parts (0.1 mole) of glyceryl monoadipate of Example 6, was dropped into the system over 40 minutes. (Therefore, the molar ratio of the monoolefin, acid anhydrides, and hydrogen peroxide was 1:1.21:1.4. The sum quantity of the two partially esterified products was 16.1% to the sum of the monoolefin and acid anhydrides.) After the addition, the system was still maintained at 40° C. for 3 hours, when the residual amount of hydrogen peroxide became constant. The conversion of the monoolefin at that time was 97.9%. Then water and unreacted hydrogen peroxide were removed from the system as it was gradually heated to 150° C. To the remaining system, 9.2 parts (0.1 mole) of glycerol, 15.3 parts (0.12 mole) of pentaerythritol, 5.4 parts (0.06 mole) of butanediol, 14.6 parts (0.1 mole) of adipic acid, and 23 parts of xylol were added, followed by gradual heating to 200° C. in nitrogen current. The reaction was continued at 200° C. until the acid value of the product reached 15.

The 60% xylol solution of the product resin had a viscosity (Gardner-Holdt) of $Z_2$. The resin solution was blended with the butylated benzoguanamine resin of Example 2 at a weight ratio of 7:3 on solid basis. Eighty (80) parts of that blend composition was further blended with 35 parts of titanium white, to form a white enamel paint. The paint was applied onto a steel plate (0.3 mm. thick) and heated at 150° C. to 20 minutes. The properties of thus hardened film were as given in Table 4.

EXAMPLE 21

The same reactor as employed in Example 10 was charged with 71.2 parts (0.29 mole) of α-olefin containing 15 to 20 carbon atoms and 39.2 parts (0.4 mole) of maleic anhydride. While the system was maintained at 40° C., a liquid mixture consisting of 33.0 parts (0.58 mole) of 60% aqueous hydrogen peroxide solution and 16 parts (0.1 mole) of ethyleneglycol monomaleate obtained in Example 5 was dropped into the system over one hour. (Therefore, the molar ratio of the α-olefin maleic anhydride and hydrogen peroxide was 1:1.38:2. The quantity of the partially esterified product was 14.5% to the sum of the α-olefin and maleic anhydride.) After the addition, the system was maintained at the same temperature for one hour, and then gradually heated to 70° C. over additional 1.5 hours, when the residual amount of hydrogen peroxide became constant. The conversion of the α-olefin at that time was 97.7%. Water and unreacted hydrogen peroxide were then removed from the system as it was gradually heated to 150° C. To the remaining system, 37.7 parts (0.41 mole) of glycerol, 16.6 parts (0.1 mole) of isophthalic acid, 11.5 parts (0.06 mole) of trimellitic anhydride, 26.7 parts (0.15 mole) of p-tertiary butylbenzoic acid and 12 parts of xylol were added, followed by gradual heating to 250° C. in nitrogen current. At that temperature, the reaction was continued until the acid value of the product was reduced to 20–22.

The 60% xylol solution of the product resin had a viscosity (Gardner-Holdt) of $Z_2$–$Z_3$. The resin solution was similarly prepared into white enamel as described in Example 20. The properties of the applied and hardened film of the enamel were as given in Table 4.

TABLE 4
[Dry film thickness, 25–30μ]

| Test item | Film performance | | | | | | | | |
|---|---|---|---|---|---|---|---|---|---|
| | Ex. 13 | Ex. 14 | Ex. 15 | Ex. 16 | Ex. 17 | Ex. 18 | Ex. 19 | Ex. 20 | Ex. 21 |
| Gloss, 60° (photo-volt) | 90 | 89 | 91 | 90 | 88 | 90 | 92 | 96 | 97 |
| Du Pont impact test (500 g.) (cm.) | 40 | 40 | 40 | 40 | 50 | 50 | 40 | 40 | 40 |
| Mandrel test (180° C., 2 mm./φ) | No change | 40 | 40 | 40 | 50 | 50 | 40 | 40 | 40 |
| Pencil hardness | H | H | H-2H | H | F-H | F-H | H-2H | H-2H | 2H |
| Immersion in boiling water (2 hrs.) | No change | H | H-2H | H | F-H | F-H | H-2H | H-2H | 2H |
| Immersion in water (50° C. 120 hrs.) | do | H | H-2H | H | F-H | F-H | H-2H | H-2H | 2H |
| Immersion in 5% NaOH solution (room temperature 96 hrs.) | Substantially no change | H | No change | H | F-H | F-H | H-2H | H-2H | 2H |
| Immersion in 5% H₂SO₄ solution (room temperature 96 hrs.) | do | H | do | H | F-H | F-H | H-2H | H-2H | 2H |

What is claimed is:

1. Process for the preparation of alkyd resins which comprises reacting monoolefins containing 6 to 20 carbon atoms with at least one polycarboxylic anhydride and hydrogen peroxide at a molor ratio of 1:1–3:1–10 at temperatures ranging 20° C. to 120° C., and subjecting the resultant reaction mixture to an esterification reaction with polyhydric alcohols at temperatures ranging from 150° C. to 270° C., until the acid value of the product is reduced to below 60.

2. Process for the preparation of alkyd resin which comprises reacting monoolefins containing 6 to 20 carbon atoms with at least one polycarboxylic anhydride and hydrogen peroxide at a molar ratio of 1:1–3:1–10 at temperatures ranging 20° C. to 120° C., and heating the resultant reaction mixture with polyhydric alcohols and at least one compound selected from the group consisting of polycarboxylic acids, polycarboxylic anhydrides and monocarboxylic acids, at temperatures ranging from 150° C. to 270° C. to perform esterification until the acid value of the product is reduced below 60.

3. Process for the preparation of alkyd resin which comprises reacting monoolefins containing 6 to20 carbon atoms with at least one polycarboxylic anhydride and hydrogen peroxide at molar ratio of 1:1–3:1–10 at temperatures ranging 20° C. to 120° C., in the presence of at least one partially esterified product having at least one unreacted hydroxyl group in a molecule, said product being obtained by the reaction of a compound selected from the group consisting of polycarboxylic acids, polycarboxylic anhydrides and monocarboxylic acids, with polyhydric alcohols, and thereafter heating the resultant reaction mixture with polyhydric alcohols to temperatures ranging 150° C. to 270° C. to perform esterification until the acid value of the product is reduced to below 60.

4. The process of claim 3 in which the partially esterified product is used in the quantity ranging 1–40 percent by weight for the combined quantity of the polycarboxylic anhydrides and monoolefins.

5. Process for the preparation of alkyd resins which comprises reacting monoolefins containing 6 to 20 carbon atoms with at least one polycarboxylic anhydride and hydrogen peroxide at a molar ratio of 1:1–3:1–10 at temperatures ranging 20° C. to 120° C., in the presence of at least one partially esterified product having at least one unreacted hydroxyl group in a molecule, said product being obtained by the reaction of a compound selected from the group consisting of polycarboxylic acids, polycarboxylic anhydrides and monocarboxylic acids, with polyhydric alcohols, and thereafter heating the resultant reaction mixture with polyhydric alcohols and at least one compound selected from the group consisting of polycarboxylic acids, polycarboxylic anhydrides and monocarboxylic acids, to temperatures ranging 150° C. to 270° C. to perform esterification until the acid value of the product is reduced to below 60.

6. The process of claim 5, in which the partially esterified product is used in the quantity ranging 1–40 percent by weight for the combined quantity of the polycarboxylic anhydrides and monoolefins.

References Cited

UNITED STATES PATENTS 2,773,909  12/1956  Smith _____ 260—635
3,287,292  11/1966  Dalibor _____ 260—22

WILLIAM H. SHORT, Primary Examiner

M. GOLDSTEIN, Assistant Examiner

U.S. Cl. X.R.

117—227; 260—16, 22, 33.6, 850